(12) United States Patent
Underkofler et al.

(10) Patent No.: US 9,135,943 B2
(45) Date of Patent: Sep. 15, 2015

(54) TAPE GUIDE WITH FLANGES

(71) Applicant: Oracle International Corporation, Redwood City, CA (US)

(72) Inventors: Daniel W. Underkofler, Lafayette, CO (US); William J. Vanderheyden, Loveland, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 61 days.

(21) Appl. No.: 13/934,262

(22) Filed: Jul. 3, 2013

(65) Prior Publication Data

US 2015/0009791 A1    Jan. 8, 2015

(51) Int. Cl.
    *G11B 15/60* (2006.01)
    *G11B 15/61* (2006.01)

(52) U.S. Cl.
    CPC ............... *G11B 15/60* (2013.01); *G11B 15/61* (2013.01)

(58) Field of Classification Search
    CPC ........... G11B 23/08757; G11B 15/605; G11B 15/60; G11B 15/67; G11B 23/047; G11B 15/61; G11B 23/08728; G11B 15/29; G11B 23/06; B65H 2701/378
    USPC ........ 360/130.21–130.24; 226/190, 191, 194, 226/196.1; 242/326.4, 346, 346.2, 615, 242/615.2, 615.3, 615.4
    See application file for complete search history.

(56) References Cited

U.S. PATENT DOCUMENTS

| | | | | |
|---|---|---|---|---|
| 4,093,149 | A * | 6/1978 | Shroff et al. | 242/338.3 |
| 4,094,478 | A * | 6/1978 | Shroff et al. | 242/334.3 |
| 4,095,758 | A * | 6/1978 | Shroff | 242/334.4 |
| 5,088,172 | A | 2/1992 | Daly | |
| 5,104,058 | A * | 4/1992 | Eggebeen | 242/346 |
| 5,173,828 | A * | 12/1992 | Tanzer et al. | 360/130.21 |
| 5,199,168 | A | 4/1993 | Daly | |
| 5,447,278 | A * | 9/1995 | Lalouette et al. | 242/335 |
| 6,320,727 | B1 * | 11/2001 | Cope et al. | 360/130.21 |
| 6,570,740 | B1 * | 5/2003 | Anderson et al. | 360/130.21 |
| 6,600,624 | B2 * | 7/2003 | Cope et al. | 360/95 |
| 6,644,581 | B2 * | 11/2003 | Plourde et al. | 242/346.1 |
| 6,873,495 | B2 * | 3/2005 | Dinhobl | 360/130.21 |
| 6,994,293 | B1 | 2/2006 | Coburn | |
| 7,204,445 | B2 * | 4/2007 | Johnson et al. | 242/346.2 |
| 7,261,250 | B1 | 8/2007 | Underkofler et al. | |
| 7,427,045 | B2 * | 9/2008 | Uchiumi et al. | 242/547 |
| 2003/0001037 | A1 * | 1/2003 | Plourde et al. | 242/346.1 |
| 2004/0222327 | A1 * | 11/2004 | Hanscom | 242/332 |
| 2004/0238669 | A1 * | 12/2004 | Mewes et al. | 242/346 |
| 2006/0027694 | A1 * | 2/2006 | Johnson et al. | 242/346 |

* cited by examiner

*Primary Examiner* — Will J Klimowicz
(74) *Attorney, Agent, or Firm* — Brooks Kushman P.C.

(57) ABSTRACT

A tape guide is provided for use with a tape drive that is configured to receive a length of tape having a tape width. The tape guide includes a body having an outer surface for receiving the tape thereon, and flanges on opposite ends of the body. The flanges may be spaced apart by a distance that is 125 to 500 microns greater than the tape width.

10 Claims, 2 Drawing Sheets

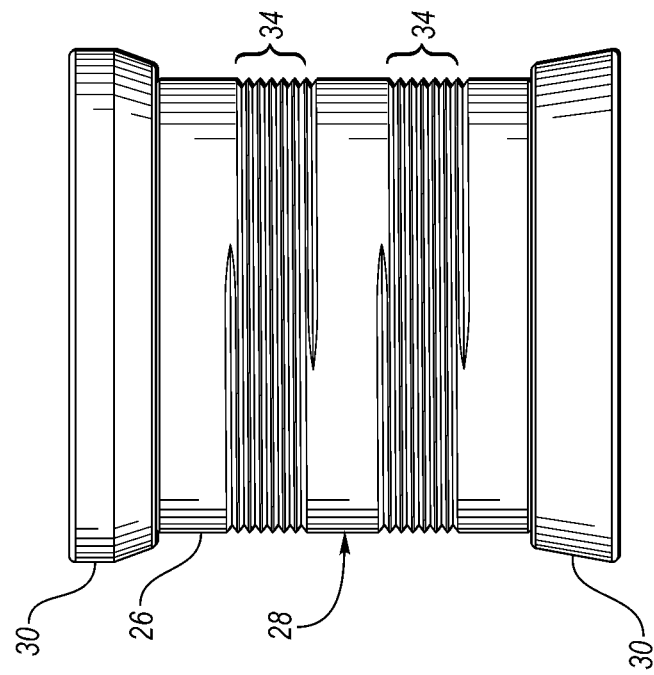
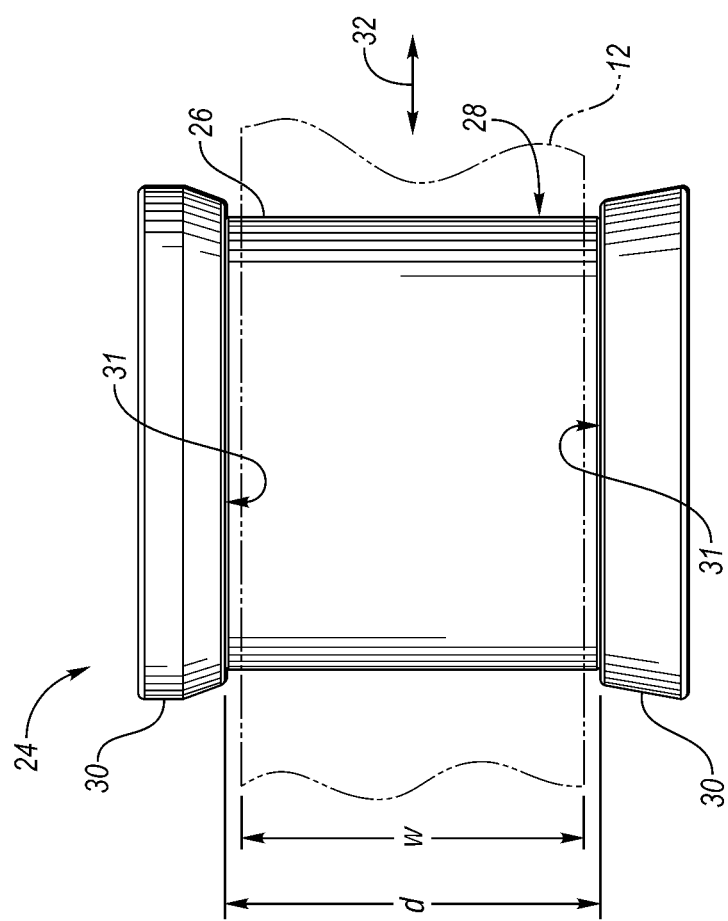
FIG. 2
FIG. 3

TAPE GUIDE WITH FLANGES

TECHNICAL FIELD

The disclosure relates to a tape guide for use with a tape drive, and a tape drive including such a guide.

BACKGROUND

Tape guides, such as guide rollers, may be used to guide a tape along a tape path in a tape drive. Examples of guide rollers are shown in U.S. Pat. No. 7,261,250.

As tape moves between guide rollers, the tape may move up and down with respect to the guide rollers. To control this lateral tape movement, prior guide rollers have been provided with relatively tightly spaced flanges, such as flanges that are spaced apart by a distance that is about 0.0008 inches greater than the width of the tape. Such guide rollers, however, may result in excessive edge loading on the tape due to imperfections in guide roller flanges, the tape and/or the drive, for example, which may cause tape edges to buckle, wear, crease or even break.

Another prior tape drive having a short tape path has been provided with flangeless guide rollers. That tape drive, however, also includes a complicated skew angle mechanism incorporated into the corresponding head/actuator.

SUMMARY

In accordance with the present disclosure, a tape guide is provided for use with a tape drive that is configured to receive a length of tape having a tape width. The tape guide includes a body having an outer surface for receiving the tape thereon, and flanges on opposite ends of the body. The flanges may be spaced apart by a distance that is 125 to 500 microns greater than the tape width. Such a configuration may effectively control lateral tape movement and tape azimuth angle, while reducing tape edge loading compared to prior drives having flanged guides.

A tape drive is also provided for use with a length of tape having a tape width. The tape drive includes a drive body and a tape guide mounted on the drive body. The tape guide includes a guide body having an outer surface for receiving the tape thereon, and flanges on opposite ends of the guide body. The flanges may be spaced apart by a distance that is 125 to 500 microns greater than the tape width.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2 is a side view of an exemplary configuration for one or more of the guide rollers; and FIG. 3 is a side view of another example configuration for one or more of the guide rollers.

DETAILED DESCRIPTION

Figure 1:
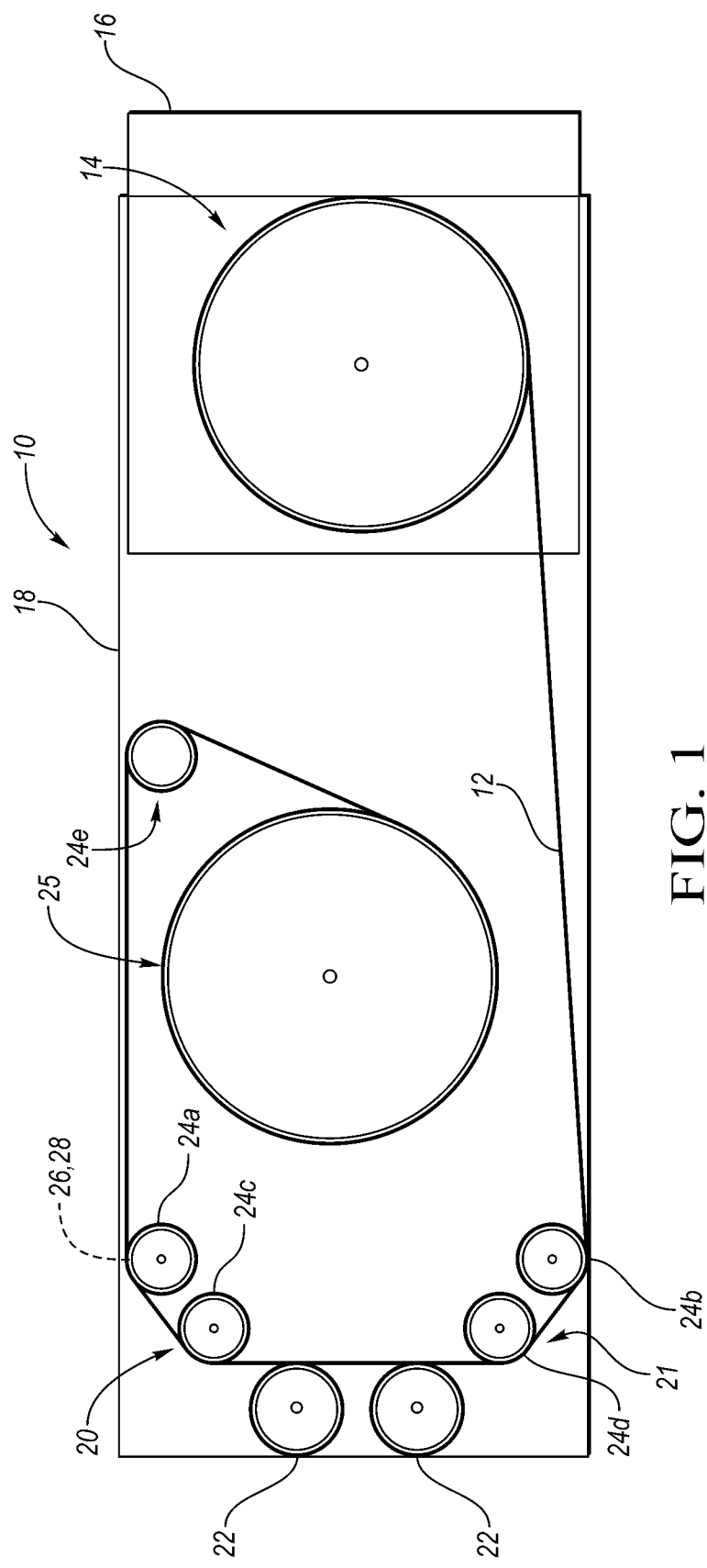
FIG. 1 is a plan view of a tape drive including multiple guide rollers according to the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a data storage device in the form of a tape drive 10, according to the present disclosure, for use with a tape 12, such as a magnetic tape or optical tape. While the tape 12 may be provided in any suitable manner, in the illustrated embodiment, the tape 12 is provided by a cartridge reel 14 of a tape cartridge 16 that is insertable into and removable from the tape drive 10. Furthermore, the tape 12 may have any suitable width, such as a width in the range of 0.4975 to 0.4985 inches (e.g., 0.4980 +/−0.0005 inches) or 0.4977 to 0.4983 inches (e.g., 0.4980 +/−0.0003 inches).

The tape drive 10 shown in FIG. 1 includes a drive body 18 configured to receive the tape cartridge 16, a tape guide arrangement 20 mounted on the drive body 18 for guiding the tape 12 along a tape path 21 of the drive body 18, and one or more heads 22, such as magnetic heads or optical heads or pick-up units, for reading data from and/or writing data to the tape 12.

The tape guide arrangement 20 may include one or more tape guides 24, such as fixed guides and/or roller guides, mounted on the drive body 18. Fixed guides may be fixedly mounted on the drive body, while roller guides may be rotatably mounted on the drive body 18. For example, each tape guide 24 configured as a roller guide may be rotatably mounted on a fixed pin or axle that extends from the drive body 18 through the center of the roller guide. Ball bearings or the like may also be used to reduce friction and minimize wear between the roller guide and the pin or axle on which it turns.

In the embodiment shown in FIG. 1, the tape guide arrangement 20 includes first and second outer tape guides 24a, 24b and first and second inner tape guides 24c, 24d positioned proximate the heads 22, and a remote tape guide 24e positioned proximate a take-up reel 25 of the tape drive 10. Any number of the tape guides 24a-e may be fixed guides or roller guides. For example, all of the tape guides 24a-e may be fixed guides, or all of the tape guides 24a-e may be roller guides. Furthermore, one or more of the tape guides 24a-e may be provided with a novel configuration, such as described below, for effectively guiding the tape 12 and controlling lateral tape movement as the tape 12 moves along or over the tape guide or guides. In addition, the configuration of the tape guides 24a-e may be varied to achieve a desired performance for the tape guide arrangement 20, as explained below in detail.

FIG. 2 shows an example configuration for use with one or more of the tape guides 24a-e. In the illustrated embodiment, the tape guide 24 is configured as a roller guide including a cylindrical or tubular hub or roller guide body 26 having a circular cross-section, for example, and a curved outer surface 28 for receiving the tape 12 thereon.

The tape guide 24 further includes flanges 30, such as parallel disc-shaped flanges, provided at opposite ends of the guide body 26. The flanges 30 extend radially beyond the guide body 26, and may assist in guiding of the tape 12. In accordance with the present disclosure, the flanges 30 are spaced apart by a greater distance relative to the width of the tape 12 as compared to prior tape guides. For example, the flanges 30 may be spaced apart by a distance d (measured between inboard surfaces 31, such as axially inwardly directed circumferentially extending surfaces, of the flanges 30) that is 125 to 500 microns greater than the width w (measured in a direction transverse to the intended travel direction 32 of the tape 12 along tape path 21) of the tape 12 (e.g., 62.5 to 250 microns greater per side of tape 12). Therefore, for a tape width w of about 0.498 inches, the flange spacing d may be about 12,774 to 13,149 microns. If the inboard surfaces 31 are not parallel, then the distance d is measured at the narrowest spacing between the inboard surfaces 31. As another example, the flanges 30 may be spaced apart by a distance d that is 250 to 500 microns greater than the tape width w (e.g., 125 to 250 microns greater per side of tape 12). Therefore, for a tape width by of about 0.498 inches, the flange spacing d may be about 12,899 to 13,149 microns.

The inventors have discovered that a relative wide spacing of the flanges 30, such as disclosed above, may still provide sufficient control of lateral tape movement (e.g., movement that is generally perpendicular to the intended travel direction 32 of tape 12 along tape path 21) and tape azimuth angle, while significantly reducing edge loading on the tape 12. This is significant, since edge loading has become a greater concern with more recent tape drives that use thinner tapes traveling at higher tape speeds.

The outer surface 28 of the roller guide body 26 may be generally smooth, as shown in the embodiment of FIG. 2. As another example, referring to FIG. 3, the outer surface 28 may include one or more grooved areas 34 that may be configured to affect traction between the roller guide body 26 and the tape 12 as the tape moves over the outer surface 28. Additional details of example grooved areas are disclosed in co-pending patent application Ser. No. 13/934,257.

As yet another example, the tape guide 24 shown in FIG. 2 may be configured as a fixed guide instead of a roller guide. In such case, while the guide body 26 of the tape guide 24 may have a circular cross-section, the guide body 26 may instead have a cross-section that is only partially curved or arcuate, such as along portions of the cross-section at which the tape 12 may engage. Furthermore, the flanges 30 may only need to extend radially beyond the guide body 26 at locations where the tape 12 will pass over the guide body 26.

As mentioned above, one or more of the tape guides 24a-e shown in FIG. 1 may have relatively widely spaced flanges 30 in accordance with the example configurations shown and described with reference to FIGS. 2 and 3. In addition, the configuration of the tape guides 24a-e may be varied to achieve a desired performance for the tape guide arrangement 20. For example, the flange spacing design of each tape guide 24a-e in tape path 21 may be optimized to reduce edge loads on the tape 12, while controlling or maintaining lateral tape motion and tape azimuth angle each within a relatively small range.

Referring to FIGS. 1 and 2, the configuration of each tape guide 24a-e may be based on location of the particular tape guide in the tape path 21, such as proximity of the particular tape guide to the heads 22. For example, the outer tape guides 24a, 24b may each be provided with relatively widely spaced flanges, and the inner tape guides 24c, 24d may each be provided with relatively tightly spaced flanges. As a more detailed example, the flanges 30 of each outer tape guide 24a, 24b may be spaced apart by a distance d that is 125 to 500 microns (or 250 to 500 microns) greater than the width w of the tape 12, and the flanges 30 of each inner tape guide 24c, 24d may be spaced apart by a distance d that is less than 50 microns greater than the width w of the tape 12. Furthermore, the tape guide 24e may be provided with flanges 30 that are spaced apart by a distance that is at least 500 microns greater than the tape width w, such that tape edges may never contact the flanges of the tape guide 24e except in relatively rare circumstances, such as during a power loss. In another embodiment, the flanges 30 of each inner tape guide 24c, 24d may be spaced apart by a distance d that is less than 25 microns (or less than 15 microns) greater than the width w of the tape 12. In the above examples, for a tape width w of about 0.498 inches, the flanges 30 of each outer tape guide 24a, 24b may be spaced apart by a distance d in the range of 12,774 to 13,149 microns (or 12,899 to 13,149 microns), the flanges 30 of each inner tape guide 24c, 24d may be spaced apart by a distance d that is less than 12,699 microns (or less than 12,674 microns or less than 12,664 microns), and the flanges 30 of the tape guide 24e may be spaced apart by a distance d that is at least 13,149 microns.

As another example, the outer tape guides 24a, 24b may each be provided with relatively tightly spaced flanges, and the inner tape guides 24c, 24d may each be provided with relatively widely spaced flanges. As a more detailed example, the flanges 30 of each outer tape guide 24a, 24b may be spaced apart by a distance d that is less than 50 microns greater than the width w of the tape 12, and the flanges 30 of each inner tape guide 24c, 24d may be spaced apart by a distance d that is 125 to 500 microns (or 250 to 500 microns) greater than the width w of the tape 12. In another embodiment, the flanges 30 of each outer tape guide 24a, 24b may be spaced apart by a distance d that is less than 25 microns (or less than 15 microns) greater than the width w of the tape 12. In the above examples, for a tape width w of about 0.498 inches, the flanges 30 of each outer tape guide 24a, 24b may be spaced apart by a distance d that is less than 12,699 microns (or less than 12,674 microns or less than 12,664 microns), and the flanges 30 of each inner tape guide 24c, 24d may be spaced apart by a distance d in the range of 12,774 to 13,149 microns (or 12,899 to 13,149 microns).

With the above tape guide configurations, lateral tape movement and tape azimuth angle can be effectively controlled, while reducing edge loading on the tape 12. As a result, tape life may be extended compared to prior tape drives including flanged tape guides, such as guide rollers. Furthermore, with the above configurations, increases in tape drive costs can be avoided.

It should be noted that each tape guide 24a-e may be made of any suitable material and in any suitable manner. For example, each tape guide 24a-e may be made of cast or molded metal or molded plastic (e.g., compression or injection molded plastic). Furthermore, if a particular tape guide 24a-e is provided with one or more grooved areas, the groove sections of the grooved areas may be formed by a milling operation. In addition, each tape guide 24a-e may be made as a single piece, or multiple pieces bonded or fused together. For example, for a particular tape guide, the flanges may be made separately from the guide body and then subsequently attached to the guide body.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tape drive for use with a length of tape, the tape drive comprising:
 a drive body;
 a tape head;
 a tape guide mounted on the drive body, the tape guide including a guide body having an outer surface for receiving the tape thereon, and flanges on opposite ends of the guide body, the flanges being spaced apart by a distance in the range of 12,761.5 to 13,161.9 microns;

an additional tape guide mounted on the drive body such that the tape head is located between the tape guide and the additional tape guide, the additional tape guide including a guide body having an outer surface for receiving the tape thereon, and flanges on opposite ends of the guide body, the flanges of the additional tape guide being spaced apart by a distance in the range of 12,761.5 to 13,161.9 microns; and first and second outer tape guides mounted on the drive body such that the tape guide and the additional tape guide are positioned between the outer tape guides, each of the outer tape guides including a guide body having an outer surface for receiving the tape thereon, and flanges on opposite ends of the guide body, wherein, for each of the outer tape guides, the associated flanges are spaced apart by a distance that is less than 12,711.9 microns.

2. The tape drive of claim 1 wherein the tape guide is a tape guide roller, and the body of the tape guide roller is rotatably mounted on the drive body.

3. The tape drive of claim 1 wherein for each of the outer tape guides, the associated flanges are spaced apart by a distance that is less than 12,686.9 microns.

4. The tape drive of claim 1 wherein for each of the outer tape guides, the associated flanges are spaced apart by a distance that is less than 12,676.9 microns.

5. The tape drive of claim 1 wherein the flanges of the tape guide are spaced apart by a distance in the range of 12,899.2 to 13,149.2 microns.

6. A tape drive for use with a length of tape, the tape drive comprising:
   a drive body;
   a tape head;
   a tape guide mounted on the drive body, the tape guide including a guide body having an outer surface for receiving the tape thereon, and flanges on opposite ends of the guide body, the flanges being spaced apart by a distance in the range of 12,761.5 to 13,161.9 microns;
   an additional tape guide mounted on the drive body such that the tape head is located between the tape guide and the additional tape guide, the additional tape guide including a guide body having an outer surface for receiving the tape thereon, and flanges on opposite ends of the guide body, the flanges of the additional tape guide being spaced apart by a distance in the range of 12,761.5 to 13,161.9 microns; and
   first and second inner tape guides mounted on the drive body such that the inner tape guides are positioned between the tape guide and the additional tape guide, each of the inner tape guides including a guide body having an outer surface for receiving the tape thereon, and flanges on opposite ends of the guide body, wherein, for each of the inner tape guides, the associated flanges are spaced apart by a distance that is less than 12,711.9 microns.

7. The tape drive of claim 6 wherein the flanges of the tape guide are spaced apart by a distance in the range of 12,899.2 to 13,149.2 microns.

8. The tape drive of claim 6 wherein the first and second inner tape guides are first and second inner tape guide rollers, respectively.

9. The tape drive of claim 6 wherein for each of the inner tape guides, the associated flanges are spaced apart by a distance that is less than 12,686.9 microns.

10. The tape drive of claim 6 wherein for each of the inner tape guides, the associated flanges are spaced apart by a distance that is less than 12,676.9 microns.

* * * * *